United States Patent

Ahlen

[11] 4,155,222
[45] May 22, 1979

[54] HYDRODYNAMIC TORQUE CONVERTERS

[75] Inventor: Karl G. Ahlen, Stockholm, Sweden

[73] Assignee: S.R.M. Hydromekanik AB, Stockholm, Sweden

[21] Appl. No.: 868,341

[22] Filed: Jan. 10, 1978

[51] Int. Cl.² .............................................. F16D 33/00
[52] U.S. Cl. ........................................ 60/361; 60/364; 60/367
[58] Field of Search .................. 60/361, 362, 364, 367

[56] References Cited

U.S. PATENT DOCUMENTS

2,357,338  9/1944  Lysholm ................................. 60/367
3,071,928  1/1963  Dundore et al. ....................... 60/361

Primary Examiner—Edgar W. Geoghegan
Attorney, Agent, or Firm—Larson, Taylor and Hinds

[57] ABSTRACT

This invention relates to hydrodynamic torque converters and in particular to improvements therein relating to the blade system and to the shape of the toroidal working chamber. For situations wherein a more or less distinct top speed is required, even when direct drive is not used, and where it is important to avoid the simultaneous existence of high torque absorption and low efficiency at high speed ratios, the blade system according to the present invention is advantageous, said system being characterized by a range of ratios for the radii of the outlet and inlet edges of the pump, turbine and guide blades as well as a range of angles $\alpha$, $\beta$, $\gamma$ and $\delta$ as herein defined. The toroidal working chamber comprises a pair of outer peripheral walls formed of essentially straight lines which converge radially outwardly and an inner core also defined by essentially radially extending straight lines which intersect no farther out than the intersection of the straight lines of the outer peripheral walls.

13 Claims, 9 Drawing Figures

HYDRODYNAMIC TORQUE CONVERTERS

This invention relates to hydrodynamic torque converters and especially to a torque converter blade system which affords improved torque and efficiency characteristics when compared with known torque converter blade systems and to a new form of the toroidal working chamber in which the blades are located. The torque converter of the invention is particularly suitable for use in transmissions for diggers and earth moving equipment.

It is characteristic of hydrodynamic torque converters that the extent to which the input torque is increased or multiplied by the converter is greatest at or close to stall condition, that is, with the pump member operating and with the turbine member standing still. As the speed ($n_2$) of the turbine member rises from zero relative to the speed ($n_1$) of the pump the torque multiplication usually referred to as the torque ratio, decreases, and at some value of the ratio $n_2/n_1$ less than unity, the value of the output torque falls to that of the input torque. When this point, commonly referred to as the shift point, is reached the apparatus no longer functions as a torque multiplying device and, if the speed of the turbine member is increased to produce a higher value of $n_2/n_1$ than that at the shift point, the output torque falls to a value less than that of the input torque, so that the apparatus has no utility. Thus the useful range of a hydrodynamic torque converter is normally between stall and shift point but for the torque converters in question, the required range is from stall to 70%.

Generally speaking torque converters fall into one of two main types, namely a 1 and ½-stage type or a 2-stage type. In the 1 and ½-stage type the torque converter blade system has only one ring of pump blades, one ring of turbine blades and one ring of guide blades whereas the 2-stage type has one ring of pump blades and two rings of turbine blades with one intermediate ring of guide blades. However, many variants of these two main types of torque converter blade systems have been proposed including blade systems having a divided guide blade ring and/or large numbers of rings of turbine blades and/or rings of guide blades and even a divided pump ring.

The present invention is particularly but not exclusively directed to a torque converter blade system of the 1 and ½-stage type wherein the ring of guide blades is located in the torque converter working chamber in a position (considered relative to the direction of fluid flow within the working chamber) between the outlet of the turbine blades and the inlet of the pump blades and may be positioned close to either the turbine or the pump blades. The working chamber may be formed with many different cross-sectional shapes such as circular, half-circular, or pear-shaped, etc.

A torque converter blade system according to one aspect of the present invention influences the fluid circulation in the blade system inter alia by virtue of novel and specific blade shapes, so that, when the so-called shift-point is reached, the circulation of fluid in the blade system rapidly diminishes. Rapid diminution of the fluid circulation results in not only a reduction in the torque absorption but also a simultaneous reduction in the efficiency, thereby avoiding a high torque absorption and low efficiency when the torque converter is running above the shift point, since under such running conditions mechanical energy is simply converted into heat.

One known method of avoiding this disadvantageous condition is the use of a free wheel on the guide vane shaft so that, when the pump and turbine are rotated at the same speed, there is no force creating fluid circulation within the working chamber. The torque absorption of the blade system is, therefore, low and depends primarily on the torque necessary to drive the free wheel. At speed ratios between the shift point and $n_2/n_1 = 1$ the guide blades are free wheeling and the torque converter operates as a coupling with the torque absorption related to $n_1$ and to $(n_2/n_1)$.

However, the existence of a free wheel in the torque converter invariably causes problems because it is required to function normally, while running in oil, both during connection and when free-wheeling at high speed. Moreover, the free wheel is located in a space completely filled with oil having a viscosity which may vary over a wide range due primarily to the variation in temperature within the working chamber. A wide variation in the viscosity considerably reduces the safety limits of the friction force required to lock the free wheel. The temperature of the fluid in the working chamber may be within the range $-40°$ C. up to $+k50°$ C., and in spite of such a wide temperature range it is not unusual for different oils between SAE 5 and SAE 20 or even SAE 30 to be used.

The blade system of the present invention provides apart from specific new characteristics, an extremely high peak efficiency in relation to the stall torque ratio obtained as well as providing favorable input torque characteristics below the shift point.

The blade system of the invention allows a torque converter incorporating a lock-up clutch to also include a stationary ring of guide blades without producing excessive losses in direct drive. In fact such a converter only produces about 2% losses considered in relation to full input power at stall and $n_1$ maximum whereas a loss of the order of 1% can be expected when the ring of guide blades is mounted on a free wheel. Simultaneously, it should be borne in mind that the free wheel is the weakest point in such torque converters in that it is the only component which causes trouble.

Thus elimination of the free wheel, even in the normal power range for heavy duty service is of utmost interest, and more particularly in cases where the torque converter includes the power saving lock-up clutch in conjunction with a multi-step gear box.

Furthermore, relatively large torque converters require large free wheels which are not generally available off-the-shelf and must, therefore, be specially made, thereby increasing the cost of the torque converter. In such applications the loss of an extra 1% in direct drive when eliminating the free wheel is less important, especially when a manufacturer or user can completely ignore the cost and availability of the free wheel units.

In applications where a free wheel is desirable, the conditions, under which the free wheel operates are improved, because the normal drag torque of the free wheel using a blade system according to the invention is sufficient to reduce the speed of rotation of the ring of guide blades to 25% of the speed of the rings of the pump and the turbine blades. Thus, the loss is in fact lower than the normal percentage loss and, simultaneously, wear on the free wheel is reduced by virtue of the reduction in relative speeds.

In applications where a torque converter according to the invention with or without direct drive is combined with a mechanical gear transmission, automatic shifts are not necessarily required because it is not possible to run at high speed ratios with low efficiency and high torque absorption. In such cases it is not necessary to effect a shift into a higher gear at a distinct point. It does not matter, therefore, if the driver effects a shift too late because a late shift will neither create overheating nor increase fuel consumption. In fact, for an application where direct drive will not be used, there is obtained for the first time not only a distinct top speed in each gear but also the advantage that driving under unacceptable conditions is not possible.

According to one aspect of the present invention there is provided a hydrodynamic torque converter comprising a rotatable casing enclosing a closed circuit for circulation of a working fluid defined by a toroidal working chamber having an annular core therein, the closed circuit including in cross-section an outflow section, an inflow section and radial inner and radial outer transition regions connecting the inflow and outflow sections, a blade system located within the working chamber and including a ring of pump blades, a ring of guide blades, and a ring of turbine blades, the blades of the blade system being generally radially disposed within the working chamber in accordance with the parameters set out in the Table 1 below, in which $R_o/R_i$ is the ratio of the outlet and inlet radii for the respective rings of blades, $\alpha$ (alpha) is the inlet angle of the blades, $\beta$ (beta) is that angle formed between a chord drawn for a blade and a radial line drawn from the centre of rotation of the system and the outermost edge of the blade, $\gamma$ (gamma) is the angle subtended at the centre of rotation of the blade system by the innermost edges of two adjacent blades, $\delta$ (delta) is a measure of the curvature of the blade, z is the maximum and minimum number of blades in the blade rings, and in which the radii of the outermost and innermost edges of the blades of the various rings are designated $R_o$ and $R_i$ respectively.

With a blade system of such a form, above a certain speed ratio, which is only a little higher than the shift point, and for speed ratios higher than this value, different quantities of circulation of fluid through the blade system produce practically no change in the direction of fluid flow through the guide blades, whereby, at lock-up, where the pump and the turbine rotate at the same speed, the guide blades may rotate slowly or be stationary thereby reducing agitation of the working fluid because the drag torque of the guide blades will not, of itself, contribute to but will counteract fluid circulation. When the guide blades are stationary in conditions above the shift point, the guide blades operate to balance the pumping effect of the pump blades relative to the turbine blades in such a way that a low fluid circulation prevails through the blade system, so as to achieve a low torque absorption.

It is important that the fluid circulation is achieved within a small change of speed ratio. The reason is that the inlet direction to the guide blades change quickly in the range close to the shift point, since with a constant fluid quantity (which is counteracted by reduction in fluid circulation) the quantity of fluid circulated drops quickly due to the shape of the blade system according to the invention to values giving a reduced torque absorption.

A torque converter according to the present invention includes a blade system which permits the torque absorption to be varied continuously by different settings of the guide blades in the same basic blade structure. Such an arrangement allows an improved shaping of the pump blades thereby increasing the utility range of the torque converter. Further, the blade system results in the speed having less influence on the stall torque ratio and torque absorption at stall as well as being less sensitive to the viscosity of the working fluid.

Another aspect of the present invention relates to the shape of the toroidal working chamber of a hydrodynamic torque converter transmission for vehicles.

Ljungstrom AB, predecessors of the Assignees hereof, developed a 1 and ½ stage torque converter in which the toroidal working chamber had parallel or tapered sides with the major walls of the inner core parallel, as shown for example in U.S. Pat. No. 2,357,338.

With the passing of time, certain features have become more important, for instance, for earth moving equipment the amount of torque absorption has become of utmost importance. It is possible to vary the torque absorption by modifying the pump in small steps but, from a manufacturing point of view, this is not attractive.

The present development aims to limit the necessary number of pump blades and to vary the torque absorption continuously by different settings of the guide blades.

It is therefore a further aim of the present invention to provide a blade system which is capable of accepting deviations in the direction of flow of the working fluid within the torque converter working chamber.

These aims of the present invention are achieved by a new form of the toroidal working chamber by reducing the angular extent and consequently, the fluid flow path between inflow and outflow sections of the chamber. The reduction of the angular extent between the inflow and outflow sections, while increasing certain fluid flow losses, nevertheless produces a net reduction in the total losses usually associated with such torque converters.

Thus, accordingly, in this aspect of the present invention there is provided a hydrodynamic torque converter of the rotating casing type enclosing a toroidally shaped closed circuit for circulation of a working fluid defined by an inner and an outer periphery, an annular core located in the closed circuit and defining the shape of the inner periphery, the circuit comprising an outflow section and an inflow section, a radially outer and a radially inner transition region connecting the outermost and innermost parts of the said sections, a ring of pump blades located in the outflow section and a ring of turbine blades located in the inflow section and a ring of guide blades between the turbine and the pump blades, characterized in that, when considered in a section taken in a radial plane passing through the axis of rotation of the casing, the majority of the inner core and outer peripheries defining the outflow and the inflow sections consist of straight lines which converge radially outwardly and in that the said straight lines defining the said outer peripheries of the inflow and outflow sections intersect each other no closer to the axis of rotation of the torque converter then the intersection of the said straight lines defining the inner core walls of the inflow and outflow sections.

The aims of the present invention may also be achieved by modifying the profile of the guide blades while retaining the shape of the turbine blades and only modifying the pump blades according to the inlet and outlet diameters required.

Particularly advantageous results are obtained by combining the new toroidal form of working chamber described above with the modified blade system.

There follows a detailed description of preferred embodiments of the invention to be read together with the accompanying drawings wherein.

Figure 1:
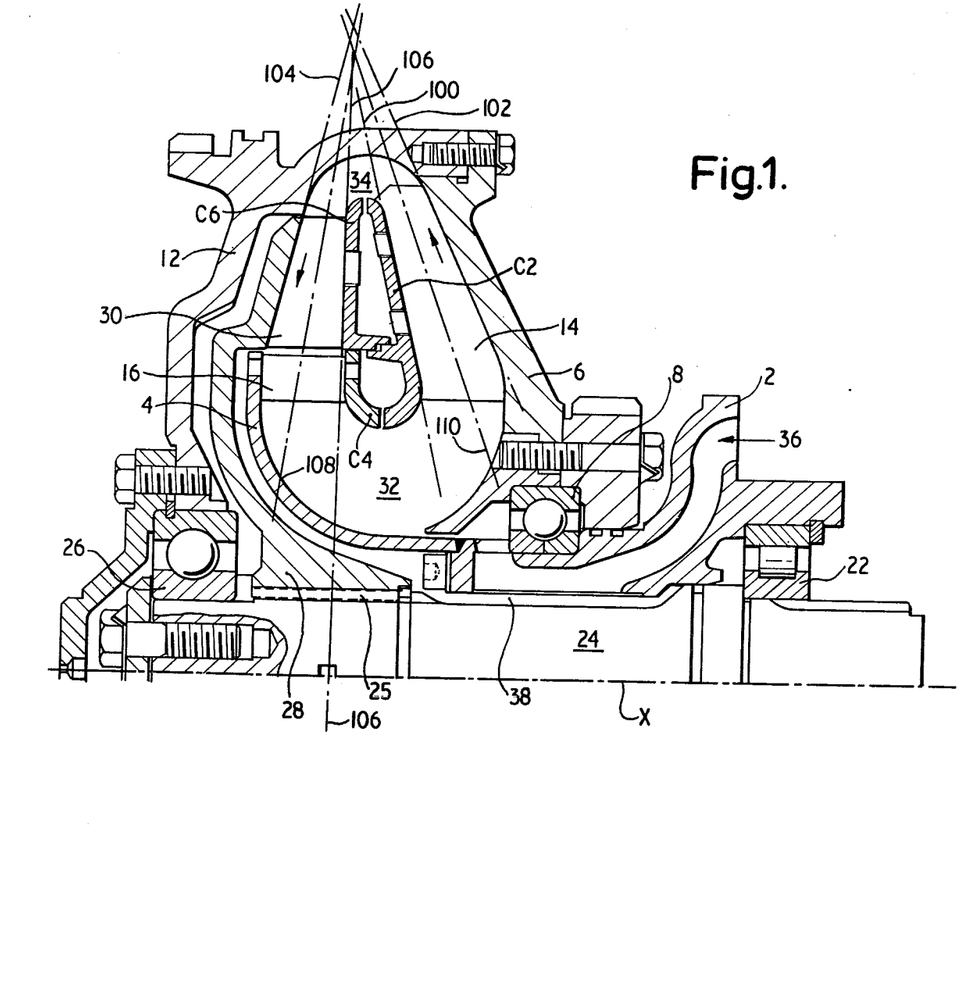
FIG. 1 is a cross-section of one half of a torque converter having a blade system according to the invention.

The torque converter of FIG. 1 has a so called 1 and ½ stage blade system which in its simplest form has one ring of pump blades, one ring of turbine blades and one ring of guide blades.

In FIG. 1, reference 2 is a stationary abutment to which a guide blade hub 4 is attached and on which part 6 of a rotatable casing is mounted via a bearing 8. The rotatable casing part 6 also has a front part 12. A ring of pump blades 14 is carried by the part 6 whereas the guide blade hub 4 carries a ring of guide blades 16.

The stationary abutment 2 is journalled through a bearing 22 onto a turbine shaft 24 which is also journalled in the front part 12 of the rotatable casing by a bearing 26. A turbine hub 28 carrying the turbine blades 30 is rotationally fixedly carried on the turbine shaft 24 by a spline connection 25.

As seen from FIG. 1, the outermost ends of the pump 14, guide 16 and turbine 30 blades, are carried respectively by part 6, guide hub 4 and turbine hub 28. On the other hand the innermost ends of the blades are supported by an annular core which together with part 6 and the guide and turbine hubs 4 and 28 respectively defines a toroidally shaped closed circuit for the circulation of working fluid.

The annular core consists of three parts, namely, C2, C4 and C6 respectively supporting the innermost ends of the pump blades 14, guide blades 16 and turbine blades 30. The part of the toroidally shaped closed circuit containing the pump blades is referred to herein as the outflow section and the part containing the guide and turbine blades is referred to as the inflow section. As seen from FIG. 1, the radially innermost and the radially outermost parts of the circuit (considered relative to axis X of the turbine shaft 24) constitute what are referred to herein as the radially inner transition region 32 and the radially outer transition region 34, respectively.

Circulation of fluid and maintenance of the pressure thereof is accomplished between a channel 36 and a further similar channel not shown but located in the mirror image half of the stationary abutment. Communication between channel 36 and the said other channel (not shown) is around the turbine shaft 24 in the region of relieved portion 38 thereof. Such a relieved portion avoids the customary arrangement of boring holes through the turbine shaft.

The majority of the outflow section of the toroidal circuit is, when considered in the plane of FIG. 1, defined by two straight lines 100 and 102 which converge radially outwardly. Similarly, the majority of the inflow section is defined by two straight lines 104 and 106 which also converge radially outwardly. According to the present invention, lines 100 and 106 converge at a point at the same distance from or closer to the axis X than the intersection of lines 102 and 104.

According to a preferred embodiment of the torque converter of this invention line 106 is disposed in a plane which is essentially normal to the axis of rotation X of the turbine shaft 24. Further, the angles between lines 100 and 106 and between 102 and 104 are preferably within the ranges (6 to 19)° and (20 to 43)° respectively.

Lines 108 and 110 in FIG. 1 represent intermediate lines bisecting the inflow and outflow sections and these lines converge radially outwardly and intersect in an angle falling within the range (20 to 30)°.

Figures 2, 2A:
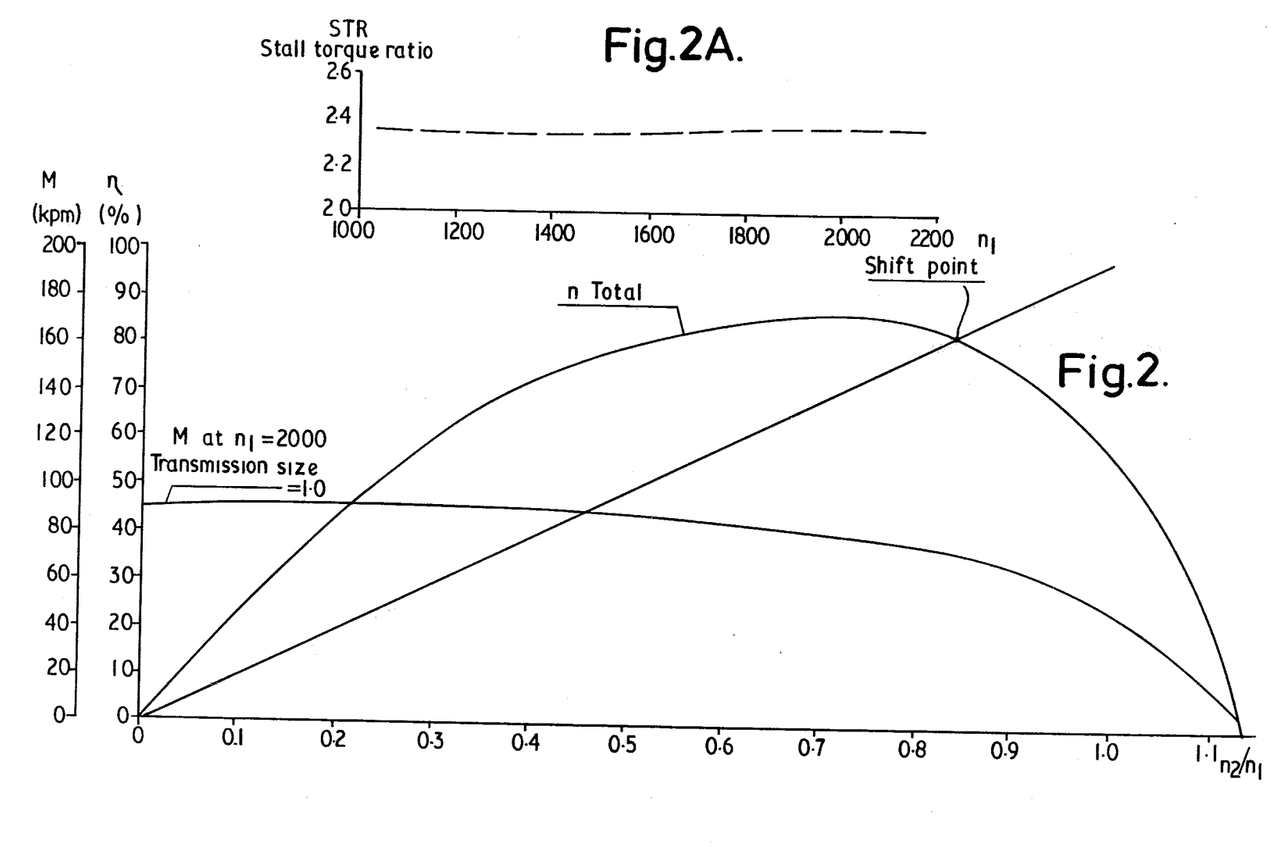
FIGS. 2 and 2A are graphs showing the performance of the torque converter according to FIG. 1 and with the blade system constructed and arranged for a relatively high torque absorption characteristic.

FIGS. 2 and 2A show graphically specific characteristics of the blade system and construction of the toroidal working chamber.

FIG. 2A shows the stall torque ratio (STR) of a torque converter having a blade system designed for a relatively high torque absorption with the pump blades having their outlet edges disposed on a fairly large diameter and with the outlet in radial or positive direction relative to the pump movement. It will be observed from FIG. 2 that a shift point of $n_2/n_1 = 0.835$ is achieved and that thereafter the torque absorption M falls gently to stall conditions thereby giving an increased utility range when compared with known converters.

Figure 3A:
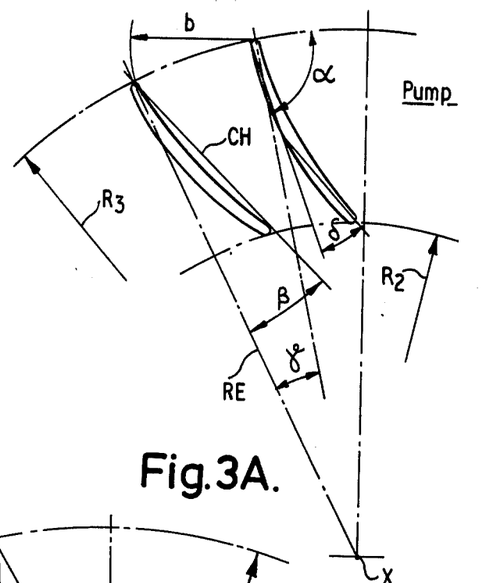
FIGS. 3A, 3B and 3C show diagrammatically the blade shapes and their location in the respective blade rings and particularly different blade angles and the radius given in the Table included hereinafter.
Figure 3B:
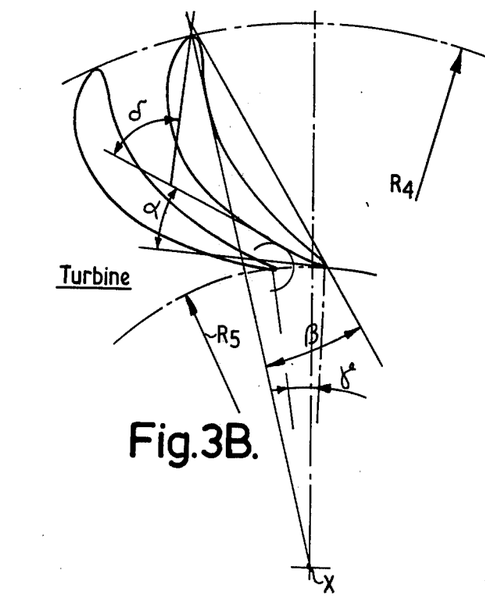
Figure 3C:
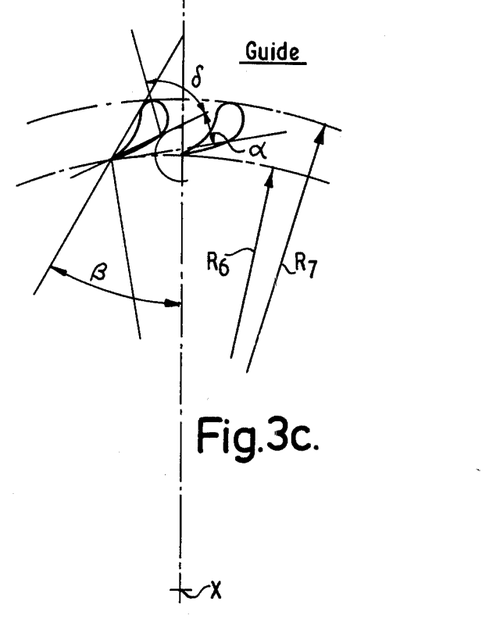

FIGS. 3A, 3B, 3C show, schematically, pump blades 14, turbine blades 30 and guide blades 16 bearing references relating to characteristic dimensions and angular relationships concerning disposition of the blades in their blade rings. In these Figures, the radii bearing references $R_2$ to $R_7$ relate to the inner and outer radii of the various blade rings. In these Figures:

α (alpha) indicates the inlet angle of the several blades and b the minimum distance between adjacent blades in the same blade ring. Considered slightly differently b is the narrowest or throat portion of the flow channels formed between adjacent blades. Considered geometrically α is that angle formed between a tangent drawn to a circle of radius b struck from a center located on the inlet edge of the blade, and another tangent drawn at the said center and to a circle containing all the inlet edges of a ring of blades, for example, a circle of radius $R_3$ for the pump blades.

β (beta) is that angle between a chord CH drawn so as to touch the blade profile at both ends at a single point and a radial line RE (FIG. 3A).

γ (gamma) is that angle subtended at the axis of rotation X of the blade system by inlet edges Ii and Iii of the ring of turbine blades shown in FIG. 3B.

δ (delta) is a measure of the curvature or angular deviation between the inlet and outlet of each blade and is the angle formed at the intersection of center lines drawn through the inlet and outlet edges of a blade.

Specific values for the number of blades Z in a blade ring and the maximum and minimum radii for the inlet and outlets of the blade rings and the angles α, β, γ and δ, measured in degrees, are indicated in the following table:

TABLE 1

| | NO. OF BLADES Z | | Ro OUTLET/ Ri INLET | | ALPHA | | BETA | | GAMMA | | DELTA | |
|---|---|---|---|---|---|---|---|---|---|---|---|---|
| | MAX | MIN | MAX | MIN | MAX | MIN | MAX | MIN | MAX | MIN | MAX | MIN |
| GUIDE VANE 16 | 30 | 40 | 0.93 | 0.87 | 40 | 20 | 65 | 40 | 12 | 9 | 70 | 45 |
| PUMP 14 | 18 | 24 | 2.3 | 1.45 | 120 | 60 | 20 | | 12 | 15 | 30 | 20 |
| TURBINE 30 | 28 | 33 | 0.73 | 0.67 | 30 | 18 | 25 | 10 | 13 | 10 | 75 | 100 |

Figure 4A:
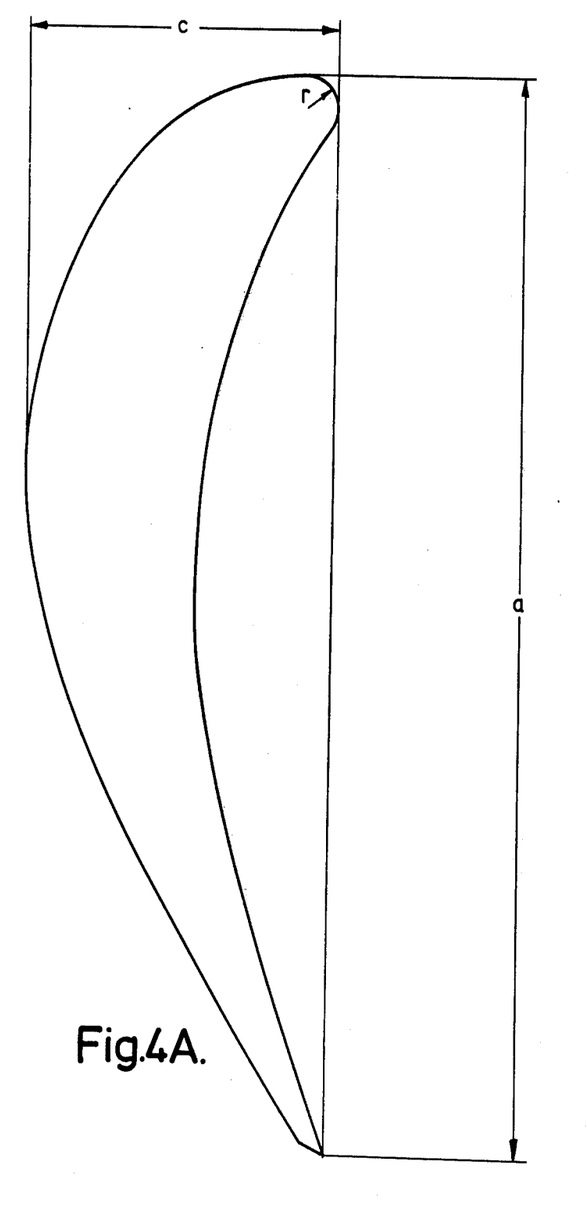
FIGS. 4A and 4B show a preferred shape of a turbine and a guide blade, respectively.
Figure 4B:
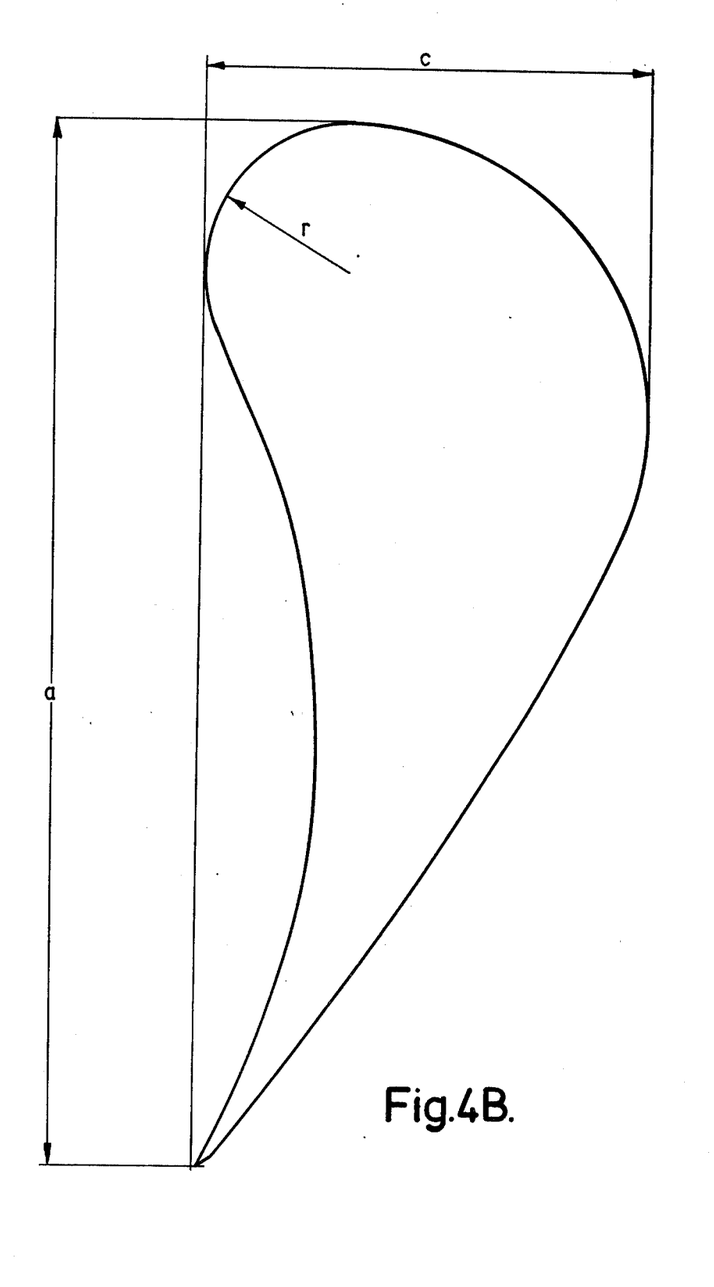

FIGS. 4A and 4B show preferred cross-sectional shapes for the turbine and guide blades, respectively, each blade having a curved inlet of radius represented by reference r and a tapered or bevelled outlet edge. In these Figures the maximum length and width of the cent blades, δ (delta) is a measure of the curvature of the blade, z is the maximum and minimum number of blades in the blade rings, and in which the radii of the outermost and innermost edges of the blades of the various rings are designated Ro and Ri respectively:

| | NO. OF BLADES Z | | Ro OUTLET/ Ri INLET | | ALPHA IN DEGREES | | BETA IN DEGREES | | GAMMA IN DEGREES | | DELTA IN DEGREES | |
|---|---|---|---|---|---|---|---|---|---|---|---|---|
| | MAX | MIN | MAX | MIN | MAX | MIN | MAX | MIN | MAX | MIN | MAX | MIN |
| GUIDE VANE | 30 | 40 | 0.93 | 0.87 | 40 | 20 | 65 | 40 | 12 | 9 | 70 | 45 |
| PUMP | 18 | 24 | 2.3 | 1.45 | 120 | 60 | 20 | | 12 | 15 | 30 | 20 |
| TURBINE | 28 | 33 | 0.73 | 0.67 | 30 | 18 | 25 | 10 | 13 | 10 | 75 | 100 | blades are indicated as a and c respectively.

Figure 5:
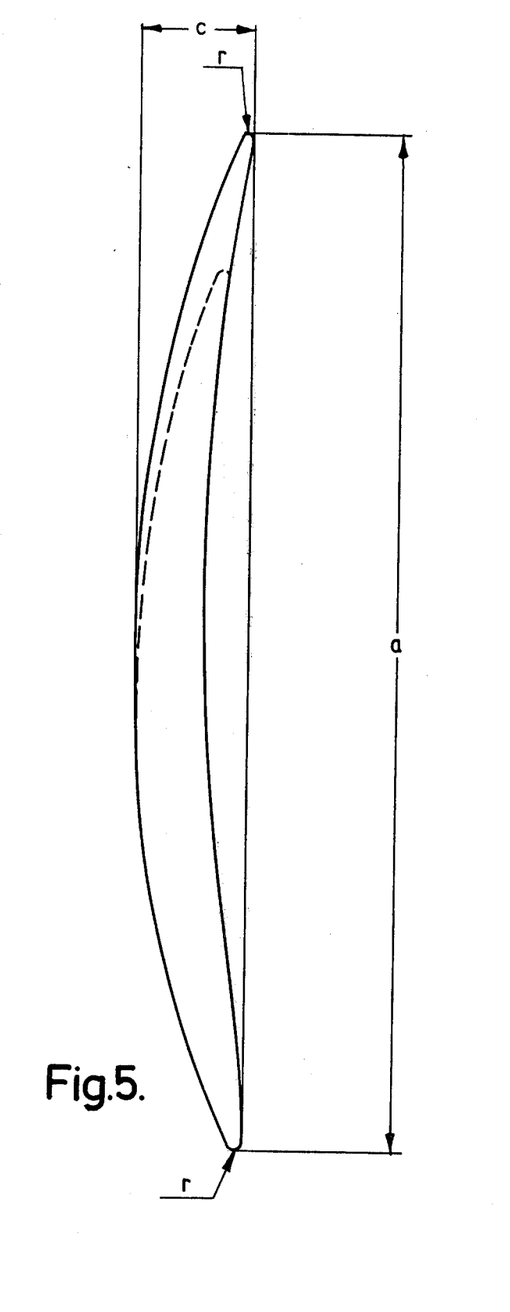
FIG. 5 shows the shape of a pump blade for a blade system having a high torque absorption without adversely influencing the specific performance characteristics shown in FIG. 2.

FIG. 5 shows a pump blade in cross-section having a length a and a breadth c and inlet and outlet edges of radius r. Although reference r has been used for nose radii in FIGS. 4A, 4B, the actual dimension of the radius for the respective blades is not necessarily the same. Further, FIGS. 4A, 4B and 5 must be viewed in conjunction with FIGS. 3A, 3B and 3C showing the angular relationship of the blades. Use of the pump blade of FIG. 5 affords the torque absorption Ms characteristic of FIG. 2, in which the continuous line represents the highest Ms. Where yet higher and lower Ms values are required, certain changes to the inlet and outlet portions of the pump blade should be made. Such changes would not, however, change the advantageous characteristics of a blade system according to the invention.

Although the invention has been described in considerable detail with respect to a preferred embodiment thereof, it will be apparent that the invention is capable of numerous modifications and variations apparent to those skilled in the art, without departing from the spirit and scope of the claims.

I claim:

1. A hydrodynamic torque converter comprising a rotatable casing enclosing a closed circuit for circulation of a working fluid defined by a toroidal working chamber having an annular core therein, the closed circuit including in cross-section an outflow section, an inflow section and radial inner and radial outer transition regions connecting the inflow and outflow sections, a blade system located within the working chamber and including a ring of pump blades, a ring of guide blades, and a ring of turbine blades, the blades of the blade system being generally radially disposed within the working chamber in accordance with the parameters set out in the following table, in which Ro/Ri is the ratio of the outlet and inlet radii for the respective rings of blades, α (alpha) is the inlet angle of the blades, β (beta) is that angle formed between a chord drawn for a blade and a radial line drawn from the centre of rotation of the system and the outermost edge of the blade, γ (gamma) is the angle subtended at the centre of rotation of the blade system by the innermost edges of two adjacent blades, δ (delta) is a measure of the curvature of the blade, z is the maximum and minimum number of blades in the blade rings, and in which the radii of the outermost and innermost edges of the blades of the various rings are designated Ro and Ri respectively:

2. A torque converter according to claim 1 wherein the ring of guide blades is rotationally fixed relative to a stationary abutment.

3. A torque converter according to claim 1 wherein the ring of turbine blades is rotationally fixedly carried by a turbine shaft constituting an output for the converter.

4. A torque converter according to claim 1 in which the blades of the said turbine ring have an inlet radius of about 0.3% of the length of the blade and the blades of the said guide ring have a nose radius of about 13% of the length of the blade.

5. A torque converter according to claim 1, wherein when considered in a section taken in a radial plane passing through the axis of rotation of the casing, the majority of the inner core and outer peripheries defining the outflow and inflow sections consist of straight lines which converge radially outwardly and in that the said straight lines defining the said outer peripheries of the inflow and outflow sections intersect each other no closer to the said axis of rotation than the intersection of the said straight lines defining the inner core of the inflow and outflow sections.

6. A torque converter according to claim 5, wherein one of the straight lines defining a part of the inner core are located in a plane which is essentially normal to the said axis of rotation.

7. A torque converter according to claim 6, wherein the said straight line essentially normal to the axis of rotation is located in the inflow section wherein the turbine blades are located.

8. A hydrodynamic torque converter of the rotating casing type enclosing a toroidally shaped closed circuit for circulation of a working fluid defined by an inner and an outer periphery, an annular core located in the closed circuit and defining the shape of the inner periphery, the circuit comprising an outflow section and an inflow section, a radially outer and a radially inner transition region connecting the outermost and innermost parts of the said sections, a ring of pump blades located in the outflow section and a ring of turbine blades located in the inflow section, and a ring of guide blades between the turbine and the pump blades, characterized in that, when considered in a section taken in a radial plane passing through the axis of rotation of the casing, the majority of the inner core and outer peripheries defining the outflow and inflow sections consist of straight lines which converge radially outwardly and in that the said straight lines defining the said outer peripheries of the inflow and outflow sections intersect each other no closer to the said axis of rotation than the intersection of the said straight lines defining the inner core of the inflow and outflow sections.

9. A torque converter according to claim 8, wherein the straight lines defining a part of the inner core are located in a plane which is essentially normal to the said axis of rotation.

10. A torque converter according to claim 9, wherein the said straight line essentially normal to the axis of rotation is located in the inflow section wherein the turbine blades are located.

11. A torque converter circuit according to claim 8, wherein the angle between intermediate lines bisecting the outflow and inflow sections intersect each other in an angle falling within the range of 20°–30°.

12. A torque converter circuit according to claim 11 or claim 8 in which the said straight lines defining the inner core converge radially outwardly within the range of 6°–19°.

13. A torque converter according to claim 8 or claim 12 in which one of the said straight lines defining the said outer periphery of the inflow and outflow sections converge radially outwardly within the range of 29°–43°.

* * * * *